Sept. 23, 1952  E. D. GEORGE  2,611,722
METHOD OF AND APPARATUS FOR SPLICING RUBBER
Filed Feb. 28, 1950  2 SHEETS—SHEET 1

Inventor
EVERETT D. GEORGE
By R. L. Miller
ATTORNEY

Sept. 23, 1952  E. D. GEORGE  2,611,722
METHOD OF AND APPARATUS FOR SPLICING RUBBER
Filed Feb. 28, 1950  2 SHEETS—SHEET 2

Inventor
EVERETT D. GEORGE

By R. L. Miller
ATTORNEY

Patented Sept. 23, 1952

2,611,722

UNITED STATES PATENT OFFICE 2,611,722

METHOD OF AND APPARATUS FOR SPLICING RUBBER

Everett D. George, Cuyahoga Falls, Ohio, assignor to Wingfoot Corporation, Akron, Ohio, a corporation of Delaware Application February 28, 1950, Serial No. 146,755

7 Claims. (Cl. 154—9)

1

The present invention relates to a method of and means for minimizing the extent of the projecting rind or flash of material customarily formed in the splice area in the splicing together of strips of plastic or rubber material. More particularly, the invention is concerned with a process and apparatus for effectively reducing the escape from the splice area of the material being spliced.

It is an object of the present invention to provide a method of and means for substantially completely encompassing at least a portion of the free ends of the material which are to be joined and exerting uniform compression thereagainst.

It is another object of the present invention to provide an improved apparatus and procedure which will insure the production of a better, more uniform splice in a splicing apparatus.

Other objects and advantages of the improved method and apparatus of the invention will be apparent from the following description of one form of apparatus for the splicing of rubber tube stock which embodies the applicant's inventive concept.

Figure 1:
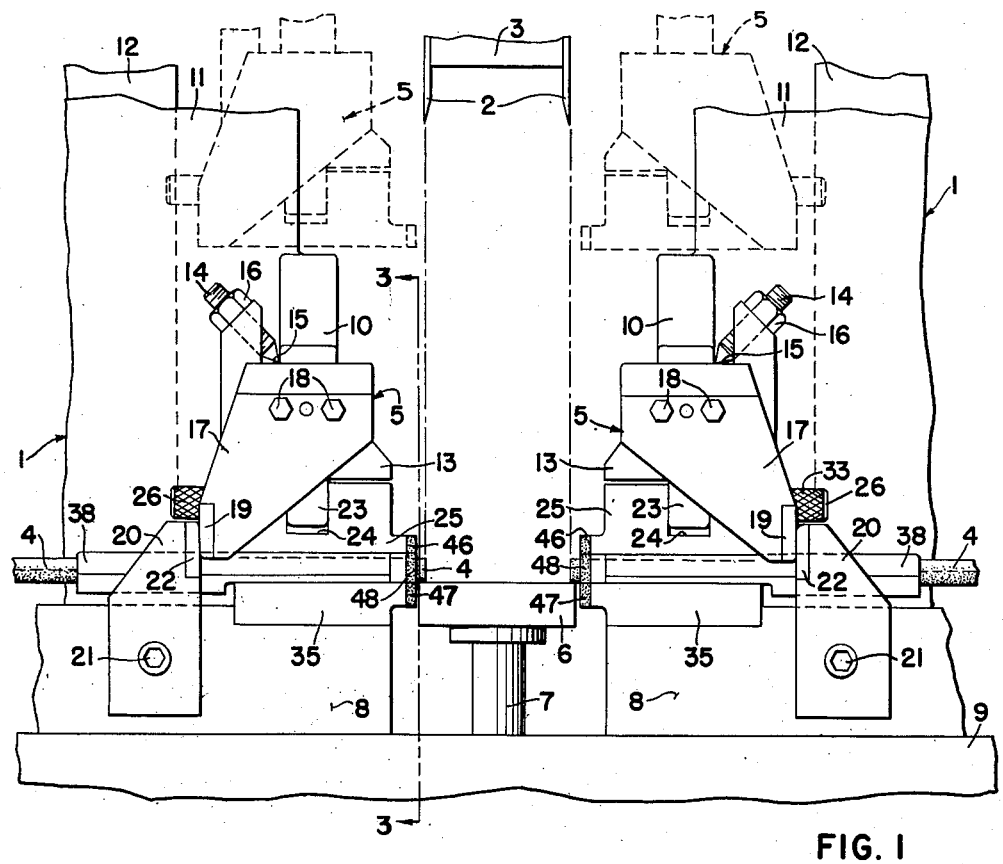
Figure 2:
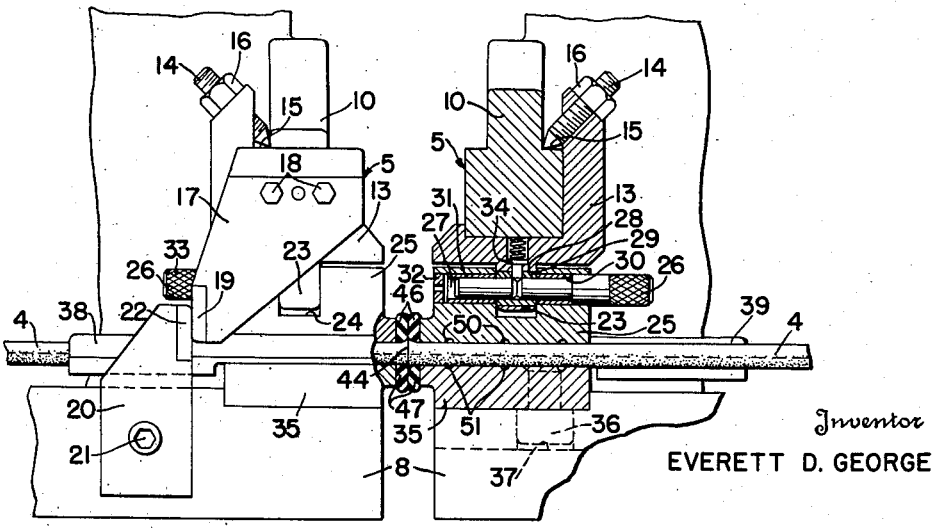
Figure 3:
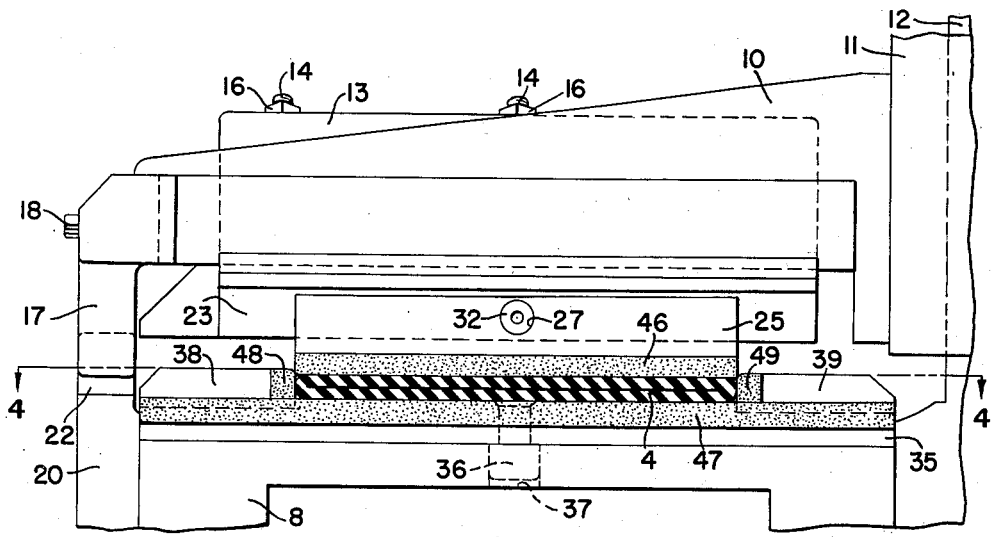
Figure 4:
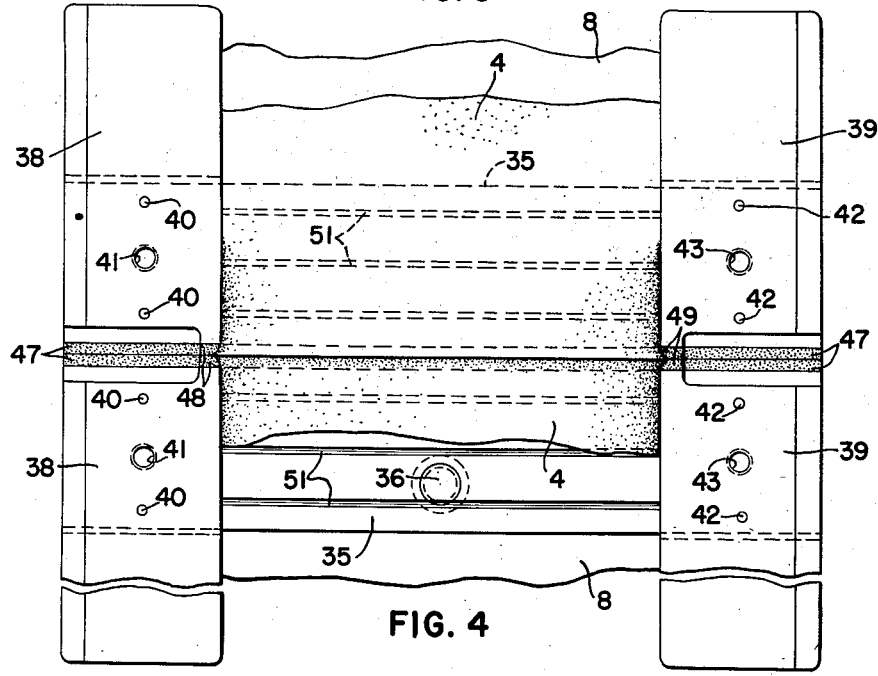
Figure 6:
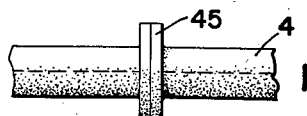
Figure 5:
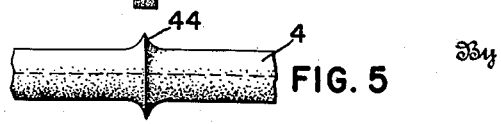

In the drawings, Fig. 1 represents a partial front elevation of a splicing apparatus which is adapted for use in the trimming and splicing of rubber tube stock in the manufacture of inner tubes for pneumatic tires and illustrates the relation of the machine elements immediately following the trimming operation. Fig. 2 corresponds generally to Fig. 1, but with the machine elements in their splicing position and with parts shown in section and broken away. Fig. 3 is a partial vertical section taken along the line 3—3 in Fig. 1. Fig. 4 is a plan view taken substantially along the line 4—4 in Fig. 3. Fig. 5 represents a segment of rubber tube stock in the splice area showing the splice achieved by the use of applicant's teaching. Fig. 6 corresponds generally with Fig. 5, but shows the usual type of splice obtained in rubber tube stock.

In Fig. 1 of the drawings the reference numeral 1 identifies a splicing apparatus generally. The splicing apparatus 1 is advantageously employed in the joining together of the ends of segments of rubber tube stock for the manufacture of inner tubes for pneumatic tires, for the forming of endless bands of tread stock for use in the manufacture of pneumatic tires and other articles formed of rubber or other similar plastic material.

In the splicing apparatus 1, a pair of knives 2 mounted upon a reciprocatory knife support 3 is employed in trimming the ends of a segment 4 of extruded rubber tube stock to provide freshly cut, tacky surfaces which are adapted to be joined together in a subsequent splicing step. To this end, the knives 2 are heated in a conventional manner (not shown) to improve the tackiness of the trimmed ends of the rubber tube stock 4. The trimming step is accomplished by lowering the knives 2 into contact with the free ends of the rubber tube stock 4 which are held in position by the holding devices 5 on an anvil 6. The anvil 6 is moved along a vertical path as by means of the piston rod 7 of a pneumatic cylinder (not shown) from the position illustrated in Fig. 1 between the carriages 8 to a retracted position therebelow.

The carriages 8 are mounted on a stationary bed 9 forming part of the splicing apparatus 1 and are capable of movement in a horizontal plane toward and away from each other. As illustrated in Fig. 1 of the drawings, the carriages 8 are widely separated during the trimming operation. After the anvil 6 has been retracted at the conclusion of the trimming operation, the carriages 8 are moved toward each other to the positions illustrated in Fig. 2, thereby urging the freshly cut tacky free ends of the rubber tube stock 4 into contact with each other. This contact is maintained under pressure for a predetermined interval of time to insure a uniform splice.

One of the essential elements of the holding devices 5 in the splicing apparatus 1 are the clamp arms 10 which are integrally formed with slide members 11 mounted in slidable relation to the vertically disposed guides 12. The mounting of the slides 11 on the guides 12 affords a freedom of movement of the clamp arms 10 in a vertical plane toward and away from the carriages 8. It will be understood that the clamp arms 10 are capable of being raised and lowered by the action of a pneumatic cylinder or other suitable means (not shown) from the positions illustrated in Fig. 1 to those indicated by the dotted line outlines therein.

A mounting means or bracket 13 is removably mounted on each of the clamp arms 10 as by means of a plurality of stud bolts 14 threaded into an upwardly projecting portion of the bracket in such fashion that they engage the shoulder 15 on the clamp arm. A locking nut 16 is provided on each of the stud bolts 14 to insure against the unauthorized loosening of the bolts caused by the operation of the apparatus. This mounting arrangement permits the adjustment or removal of the brackets 13 from the clamp arms 10.

On the free end of each of the brackets 13 opposite the slide 11 is mounted a locating means 17. The locating means 17, in each case, is secured in place by a plurality of bolts 18 threaded into the end of the arm 10. The locating means 17 is provided with a hardened plate 19 at the lowermost extremity thereof for registration with a vertically disposed stop element 20 secured in place on each of the carriages 8 as by means of a bolt 21. Hardened plates 22 corresponding to the plates 19 on the locating means 17 are provided on the stop elements 20 so as to cooperate with the plates 19 and to prevent wear when the parts contact each other.

A boss portion 23 which is substantially coextensive with the bracket 13 is formed on the under face thereof. This boss portion 23 on each of the brackets 13 registers with a groove 24 formed in a clamp member 25 mounted in depending relation to the bracket 13. The mounting of the clamp member 25, in each case, is accomplished by a pin 26 which, as shown in Fig. 2, extends through the bore 27 extending transversely of the groove 24 in the clamp member 25 and registers with a bore 28 in the boss portion 23 of the bracket 13. A suitable bushing 29 is provided in the bore 28 and similar bushings 30 and 31 are inserted in the bore 27 to insure a close fitting relationship of the pin 26 therein. A plug 32 closes the open end of the bore 27 adjacent the bushing 31 therein. A knurled portion 33 on the pin 26 facilitates its removal.

A similar mounting of the clamp member 25 with respect to the bracket 13 is provided on the other holding device 5 to enable a certain freedom of movement in the clamp member 25 in each case, thereby affording careful self-alignment of the individual clamp members with respect to the ends of the rubber tube stock 4 when the holding devices are approaching clamping position. The pin 26 is capable of being held in place against unauthorized removal by any suitable means such, for example, as the conventional releasable detent means 34 shown in detail in Fig. 2.

Cooperating with each of the clamp members 25 and also forming part of the holding devices 5 are the guide members 35 mounted on carriages 8. The guide members 35 are positioned on the carriages 8 as by means of studs 36, the enlarged heads of which register with the drill holes 37 in the carriage 8 (see Fig. 2). These guide members 35 coact with the clamp members 25 to provide a tight grip upon the rubber tube stock 4 adjacent the free ends thereof which are to be spliced together. In order that a uniform splice be obtained, it is essential that these several elements hold the material tightly in place without shifting during both the trimming and splicing steps.

The guide members 35 are provided with abutment blocks 38 adjacent their outermost or outboard ends. Similar abutment blocks 39 are provided at the innermost or inboard ends of the guide members 35. The abutment blocks 38 and 39 cooperate to locate the ends of the rubber tube stock 4 in the proper positions as the material is placed in the splicing apparatus 1 by the operator. As will be noted from Fig. 4 of the drawings, the pair of abutment blocks 38 and the corresponding pair of abutment blocks 39 are spaced apart on the uppermost face of the guide members 35 to insure that the free ends of the rubber tube stock 4 will exactly mate when the trimmed tacky ends are brought together. The abutment blocks 38 are positioned on the guide members 35 by means of a pair of locating pins 40 which are press fit into corresponding holes (not shown) in the guide members. The abutment blocks 39 are similarly positioned on the guide members 35 by locating pins 42. Tapped holes 41 and 43 are provided in the abutment blocks 38 and 39 for the reception of a screw jack (not shown) to assist in the removal of the blocks.

In the operation of the splicing apparatus 1, it is desirable, as previously indicated, in order to insure a uniform splice for the subsequent vulcanizing operation to have as small a rind or flash portion 44 as possible (see Fig. 5). It is the purpose of the present invention to provide such a splice and to avoid as much overlapping material created by the expansion of the stock as possible as the free ends are butted and jammed together. The splice 45 of Fig. 6 is exemplary of the joint formed in conventional apparatus in which no resistance is offered to the flow or expansion of the material at the abutting faces of the stock in the splice area.

As will be seen from Fig. 3, each of the several elements in contact with the free ends of the rubber tube stock 4 are provided with a resilient means which takes the form of a surface or covering of a suitable resilient medium such as the rubber or plastic facings 46, 47, 48, and 49 on the clamp member 25, guide member 35, and abutment blocks 38 and 39, respectively. Each of the holding devices 5 is so constructed as to insure the provision, through the several facings 46, 47, 48, and 49, of an increased pressure on the splice and to provide a uniform compressing action which provides an inward pressure on the tube stock at the splice. The cooperative effect of the facings 46, 47, 48, and 49 of the holding devices 5 is to effectively seal off any outward flow of the stock emanating from the splice area.

This action is clearly depicted in Fig. 2 of the drawings wherein the compression exerted between the facings 46 and 47 of the pairs of clamp members 25 and guide members 35 of the holding devices 5 acts to prevent the expansion of the stock at the free ends of the rubber tube stock 4 when they are mated under pressure. The rubber in the facings 46, 47, 48, and 49 cooperates with that of the correspondingly numbered facings on the opposed parts to resist or buck the flow of the rubber tube stock 4, thereby producing the greatly reduced rind or flash portion 44 as shown in Fig. 5 and preventing the occurrence of the excessive flash of the type identified by reference numeral 45 in Fig. 6.

To further insure a positive and uniform clamping action upon the ends of the rubber tube stock 4, a plurality of transverse grooves 50 are provided in the under surface of the clamp members 25. These grooves 50 coact with a corresponding number of transverse grooves 51 formed in the uppermost faces of the guide members 35. Other suitable forms of scoring or grooving may be provided to insure against the slippage or shifting of the ends of the rubber tube stock 4 when in their proper positions in the holding devices 5 of the splicing apparatus 1.

The principle taught herein finds equal application in other fields than the splicing of articles made of rubber, whether it be natural or synthetic in origin. It may, for example, be employed in the treatment and preparation of products fabricated from other forms of plastic material, particularly the heat hardenable plastic compounds, in which case the selection of the composition of the facings 46, 47, 48, and 49 becomes an important factor. The facings must be formed of such a composition as will produce the desired resistance or bucking action to prevent freedom of flow or expansion of the compound for which the holding devices 5 are designed.

While certain representative embodiments and details have been shown for the purpose of illustrating the invention, it will be apparent to those skilled in this art that various changes and modifications may be made therein without departing from the spirit or scope of the invention.

I claim:

1. Apparatus for mating and splicing together the ends of uncured rubber stock comprising a pair of guide members for supporting and positioning the ends of the stock to be spliced; a pair of clamp members for urging the ends of the stock against the guide members; a facing of flexible material on each guide member; and a facing of flexible material on each clamp member, said facings being disposed on their respective members adjacent the ends of the stock and coacting when compressed to completely encompass the mated ends of the stock and to resist the flow of stock in all directions emanating from the splice.

2. Apparatus for mating and splicing together the ends of uncured rubber stock employed in the manufacture of inner tubes comprising a pair of guide members for supporting and positioning the ends of the stock to be spliced; a pair of clamp members for urging the ends of the stock against the guide members; a facing of flexible plastic material on each guide member; and a facing of flexible plastic material on each clamp member, said facings being secured to the ends of the respective members immediately adjacent the ends of the stock and cooperating to completely encompass the mated ends of the stock and to resist the expansion of the stock at the splice.

3. Apparatus for mating and splicing together the ends of uncured rubber stock employed in the manufacture of inner tubes comprising a pair of guide members for supporting and positioning the ends of the stock to be spliced; a pair of clamp members for urging the ends of the stock against the guide members; a facing of vulcanized rubber on each guide member; and a facing of vulcanized rubber on each clamp member immediately adjacent the ends of the stock and cooperating to completely encompass the mated ends of the stock and to resist the expansion of the stock in the splice.

4. Apparatus for mating and splicing together the ends of uncured rubber stock employed in the manufacture of inner tubes comprising a pair of guide members for supporting and positioning the ends of the stock to be spliced, said guide members being arranged in endwise relation to each other; a pair of clamp members which register with said guide members to urge the ends of the stock thereagainst; a facing of vulcanized rubber on the adjacent ends of each of the guide members and on the corresponding ends of the clamp members; and scorings on the adjacent faces of the registering clamp members and guide members for gripping the stock ends.

5. Apparatus of the type defined in claim 4 in which the scorings on the clamp members and guide members comprise a plurality of spaced grooves disposed in opposed relation in adjacent faces of the cooperating clamp and guide members.

6. An improved method of splicing together the ends of uncured rubber stock with a minimum of projecting flash in the splice area comprising the steps of substantially completely encompassing each of the ends of the stock with a compressible material in such fashion that a portion of the stock projects slightly therebeyond; jamming the projecting portions of the stock together in mating relationship with each other; simultaneously therewith bringing the compressible material associated with one of the ends of the stock into contiguous relation with that associated with the other end of the stock, whereby a body of compressible material is formed surrounding the mated projecting portions adjacent the splice area; and compressing the compressible material around the splice to resist the flow of stock outwardly from the splice area resulting from the pressure applied to the stock ends.

7. An improved method of splicing together the ends of uncured rubber stock with a minimum of projecting flash in the splice area comprising the steps of securely gripping each of the stock ends; substantially completely encompassing each of the ends of the stock with a compressible material in such fashion that a portion of the stock projects therebeyond; jamming the projecting portions of the stock together while gripping the same to form an endless container; simultaneously therewith bringing the compressible material associated with one of the ends of the stock into contiguous relation with that associated with the other end of the stock, whereby a body of compressible material is formed surrounding the joined projecting portions adjacent the splice area; and compressing the compressible material around the splice to resist the flow of stock outwardly from the splice in a direction normal to that in which the pressure is applied to the stock ends.

EVERETT D. GEORGE.

REFERENCES CITED

The following references are of record in the file of this patent:

UNITED STATES PATENTS

| Number | Name | Date |
|---|---|---|
| 2,027,854 | Breth et al. | Jan. 14, 1936 |
| 2,186,286 | Engler et al. | Jan. 9, 1940 |
| 2,273,464 | Campbell et al. | Feb. 17, 1942 |
| 2,534,252 | Engler | Dec. 19, 1950 |
| 2,562,540 | Engler et al. | July 31, 1951 |